Patented Feb. 10, 1942

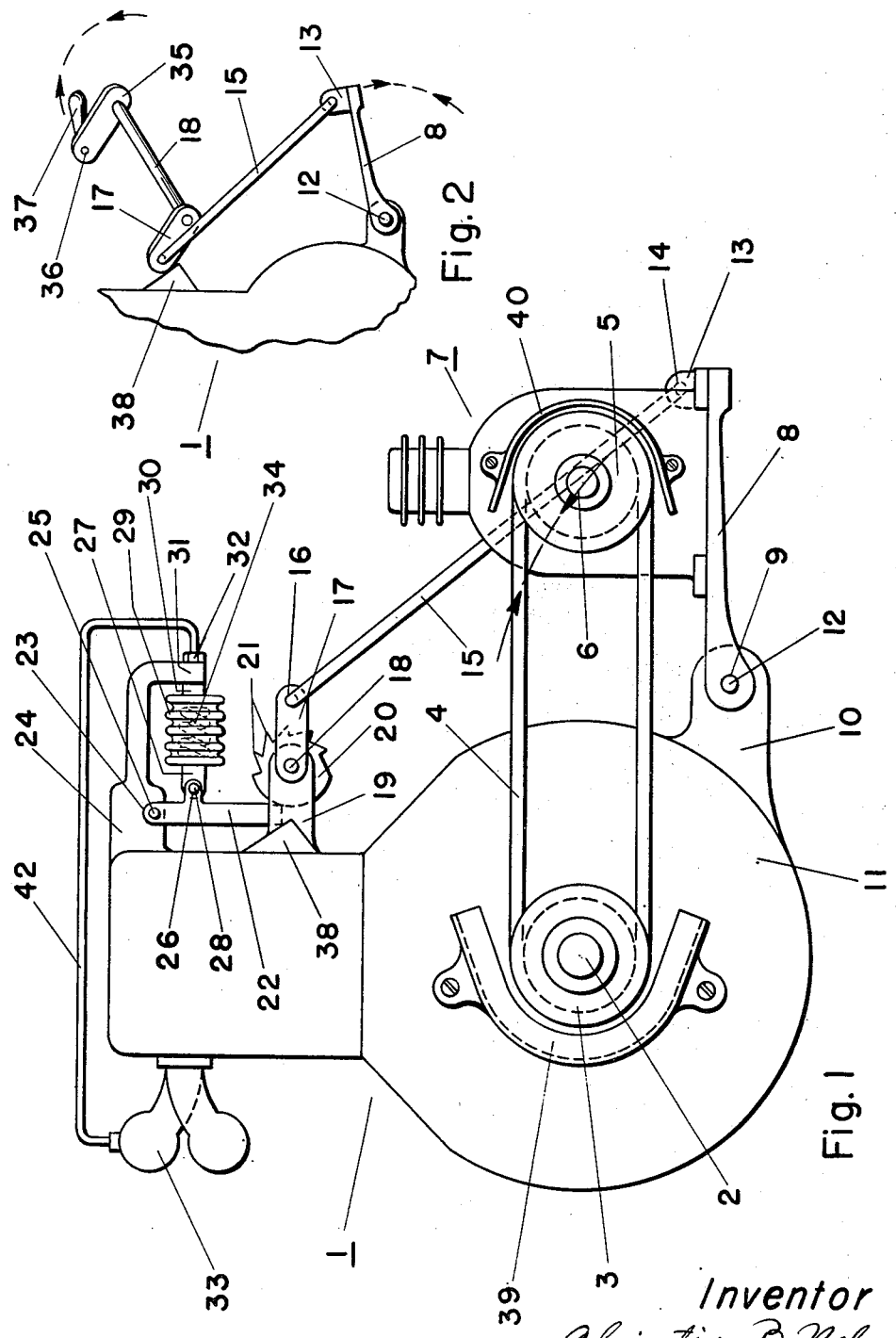

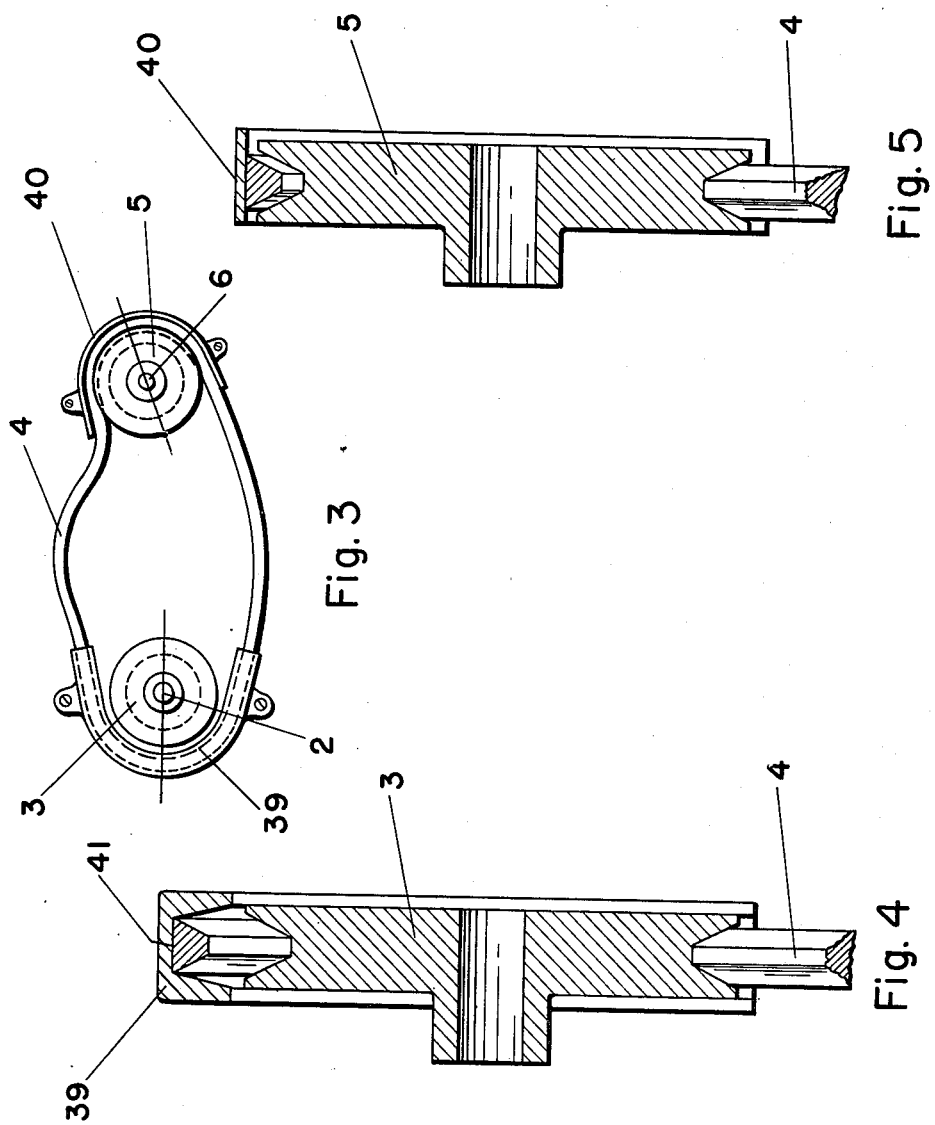

2,272,981

UNITED STATES PATENT OFFICE 2,272,981

POWER TRANSMISSION MEANS

Christian B. Nelson, Chicago, Ill., assignor to Auto Coolers, Inc., Chicago, Ill.

Application April 5, 1940, Serial No. 328,025

3 Claims. (Cl. 62—117)

The present invention relates to means for clutching and declutching a power means relative to a mechanism driven thereby, and the present embodiment of the invention relates specifically to a refrigerant compressor for cooling the body enclosure of an automobile propelled by a prime mover also serving to motivate the compressor.

Quite frequently a driven mechanism, and especially so in the present instance, should be non-operative even during the operation of the prime mover; therefore a suitable means for coupling and uncoupling the power transmission means, between the prime mover and the driven mechanism, must be provided.

Power clutches are quite old in the mechanical arts, but in general, they involve mechanical friction elements which are subject to comparatively rapid wear, necessitating frequent readjustment. Furthermore, they involve rather complicated mechanical elements to put them into or out of engagement. They also involve, if part of the power transmission comprises a flexible belt, the necessity of providing an independent adjustment of the belt pulley center distances, to compensate for variations in the belt length due to stretch, etc.

An object of the present invention is to provide an automatic belt adjustment to maintain the necessary belt tension for the transmission of the power, in combination with means to manually remove the belt tension at will.

Another object of the present invention is to remove the tension of a belt and prevent its frictional contact with its associated driving pulley, while the belt is at rest.

A further object of the present invention is to prevent the frictional re-engagement of a belt, with its associated driving pulley, after such belt has been disengaged from the pulley, until such time as the driving pulley has been brought to rest.

Other objects will be disclosed in the following specification and claims.

Referring to the drawings:

Figure 1 is a diagrammatic elevational view of a system embodying the invention.

Figure 2 is a view, partly isometric, showing most of the essential elements of Figure 1 when biased to the declutching position.

Figure 3 is a view showing the deformed shape of the belt, when the system is biased as shown in Figure 2.

Figure 4 is a cross-sectional view of the belt, the belt guard, and the driving pulley, in their relative positions, when the system is biased as shown in Figure 2.

Figure 5 is a cross-sectional view of the belt, the belt guard, and the driven pulley, in their relative positions, when the system is biased as shown in Figure 2.

In the drawings:

In Figure 1 an automobile engine 1 has a crankshaft 2 upon which is mounted a driving pulley 3 engaging a V belt 4 serving to drive a driven pulley 5 mounted upon the crankshaft 6 of a refrigerant compressor 7 fastened to a pivotal base 8 having a bore 9, aligned with a similar bore in the lug 10 of the engine crankcase 11, in which is placed a pivot pin 12 about which the compressor 7 and its associated pivotal base 8 tend to oscillate under the influence of the sum of their combined weights, thereby tending, when positioned as shown, to maintain the V belt 4 in sufficient tension to transmit the necessary power to operate the compressor 7.

So far, this system might be a conventional one having, in combination, elements all of which are old in the mechanical arts, and the following description relates to the further additions thereto in order to provide a specific embodiment of the invention.

The pivotal base 8 has a lug 13 having a bore 14 engaged by the pull rod 15 which, at its opposite end, engages the bore 16 of the rocking lever 17 fastened to the rocking shaft 18 positioned in a suitable bore of the shaft support lug 19 integral with the engine 1.

A ratchet wheel 20, fastened to the rocking shaft 18, has teeth 21 partway around its circumference, for the purpose of engaging the pawl 22 whenever the rocking shaft 18 is sufficiently rotated in an anti-clockwise manner.

The pawl 22 has a bore 23 cooperating with a similar bore in the arm member 24 in which is placed a pivot pin 25 about which the pawl 22 may be oscillated. The pawl 22 has a further bore 26, cooperating with a similar bore in the bellows cover member 27, in which is placed a pin 28, thereby forcing the pawl 22 to partake of all relative motions of the bellows 29, which has a cover member 30 at its opposite end, abutting the support 31 of the arm member 24.

The cover member 30 has a threaded end projection which, engaged by the nut 32, serves to tightly hold the same against the support 31. Depending from the end of the cover member and hermetically sealed thereto is a tube 42 providing a bore communication between the inlet manifold 33 of the engine 1, and the inside of the bellows 29, thereby transferring all conditions of vacuum within the inlet manifold 33, to the inside of the bellows 29, which contains a compression spring 34, shown in dotted outline, tending to expand the bellows 29.

The compression spring 34 is of insufficient strength to expand the bellows 29 against the normal vacuum obtaining within the inlet manifold 33 during the operation of the engine 1, which, tending to contract the bellows 29, forces the pawl 22 into pressure contact with the ratchet wheel 20 and engages the teeth 21 whenever the rocking shaft 18 is moved in an anti-clockwise direction, during the operation of the engine 1.

Whenever the pawl 22 engages the teeth 21 of the ratchet wheel 20 due to the operation of the engine 1 and a consequent vacuum within the inlet manifold 33, it will be impossible to move the rocking shaft 18 in a clockwise direction, since the engagement between the pawl 22 and the teeth 21 will prevent such movement; but, if the rocking shaft 18 has not been moved into its extreme anti-clockwise direction, it will be possible to do so, since in that direction the pawl 22 can ride over the teeth 21.

While it is possible to move the ratchet wheel 20 in an anti-clockwise direction, even if the engine 1 is in operation and a vacuum thereby produced within the bellows 29, it will become necessary to stop the said engine, thereby breaking the vacuum within the inlet manifold 33 and bellows 29, and allowing the compression spring 34 to expand the bellows 29 and move the pawl 22 out of engagement with the teeth 21 before the ratchet wheel 20 can be moved in a clockwise direction.

Under certain conditions the force of the compression spring 34 will be insufficient to overcome the frictional resistance, due to contact between the pawl 22 and the teeth 21, and in those cases the ratchet wheel 20 may momentarily be moved slightly anti-clockwise, which will allow the pawl 22 to immediately break the engagement with the teeth 21, and then the ratchet wheel 20 may be moved in the clockwise direction.

In Figure 2, it will be noted that the rocking shaft 18, to which the rocker arm 17 is fastened, has fastened thereto, at its opposite end a crank 35 having a bore 36 into which a handle 37 is fastened so that it may be moved as indicated by the arrows.

Whenever the weights of the compressor 7 and the pivotal base 8 are suspended from the pull rod 15 it is obvious that a great strain may be placed upon the pawl 22 and the teeth 21 if entire dependence were placed upon the same; therefore, as shown in Figure 2, I allow sufficient rotation of the rocking shaft 18, so that the rocking lever 17 contacts an abutment 38 integral with the engine 1 whenever the pull rod 15 sufficiently passes to the left hand of the center of the rocking shaft 18, thereby transferring the pull of the pull rod 15 to the abutment 38.

Whenever the pivotal base 8 is in the position shown in Figure 1, the V belt 4 is in tension sufficient to transmit the necessary power.

Assuming the engine 1 either in or out of operation, and it is desired to stop or prevent the operation of the compressor 7, we now rotate the rocking shaft 18 in an anti-clockwise manner, which moves the pivotal base 8, through the associated members, in an upward direction, which brings the pulley members 3 and 5 into closer proximity, as indicated by the dotted arrow line in Figure 1, thereby removing the tension of the V belt 4 and interrupting the transmission of power between the engine 1 and the compressor 7 associated with the pivotal base 8.

If no means were provided to prevent the same, we would then find that the weight of the belt 4, resting upon the contact face of the driving pulley 3, would produce a rapid wear of the same. Therefore, such prevention means prove highly desirable.

Referring to Figure 1, I have provided belt guards 39 and 40 partially encircling, but slightly spaced away from, their associated driving pulleys 3 and driven pulley 5 respectively. The belt guards 39 and 40 are suitably fastened, as indicated, to the engine 1 and compressor 7 respectively.

Since a V belt, under no tension and of limited length, tends to assume an arcuate shape and especially so if pressed in from two opposite sides, a restraint provided by the belt guards 39 and 40 whenever the pivotal base 8 is raised. Figure 3 clearly indicates the shape that the V belt 4 will assume whenever the pivotal base 8 is raised sufficiently, as indicated by the angularity of the center lines.

In Figure 4 it will be noted that the belt guard 39 is of channel form, having a recess 41 into which the V belt 4 recedes, completely out of any contact with the driving pulley 3, whenever the pivotal base 8 is raised sufficiently so that the V belt 4 assumes the shape shown in Figure 3.

In Figure 5 it will be noted that the belt guard 40 has no such recess as the recess 41 of the belt guard 39, since there is no need therefor, because whenever the V belt 4 stops, the driven pulley 5 also stops, and we need be here concerned only with sufficient clearance between the V belt 4 and the belt guard 40, so there will be no rubbing action between both, whenever the V belt 4 and driven pulley 5 are in motion.

In certain cases, it may prove desirable or necessary to place the compressor 7 at some point remote from that indicated, and I then contemplate mounting a suitable bearing bracket, on the pivotal base 8, for supporting the driven pulley 5 and its associated shaft, which would transmit the power to the remotely placed compressor 7 by means of a flexible shaft, in order to allow the proper oscillation of the pivotal base 8.

From the above, it will be seen that I have provided a simple, inexpensive means for the objects indicated.

While the above is a specific embodiment of the invention, it is understood that various modifications thereof may be employed without departing from the spirit and scope of the invention, which is to be limited only to the claims hereto appended.

I claim:

1. In a refrigeration system for cooling the body enclosure of a self-propelled vehicle, and comprising, in part, a refrigerant vapor compressor motivated by the power generating means for propelling said vehicle, the combination of a first pulley, driven by said power generating means, a second pulley associated with said compressor, flexible belt means transmitting power from the first pulley to said second pulley and thereby to the compressor, rocking means tending to separate said pulleys and maintain said belt in tension so that power energy may be exchanged between said pulleys during the operation of the power generating means, secondary means, manually operated, to bias the belt tensioning means into operative and non-operative position, the arrangement being such that the biasing into non-operative position is at will, but the biasing into operative position is subject to both will and the stoppage of the power means.

2. The method of operating a belt drive, for transmitting power, and having, in combination, a flexible belt means for transmitting the power from a first pulley means, energized by a prime mover, to a second pulley means, while said belt is in tension, which comprises alternately removing said belt tension, thereby interrupting said power transmission during the operation of the prime mover, then again restoring said tension, subject to prior stoppage of said prime mover, thereby restoring the transmission of power upon the starting of the prime mover.

3. The method of operating a belt drive, for transmitting power, and having, in combination, a flexible belt means for transmitting the power from a first pulley means, energized by a prime mover, to a second pulley means, while said belt is in tension due to maintaining both pulley means at sufficient distance apart, which comprises alternately varying the distance apart, of said pulleys, thereby alternately tensioning and non-tensioning the belt and the recurrent tensioning of the belt being subject to a stoppage of the prime mover, prior to such tensioning.

CHRISTIAN B. NELSON.